June 10, 1924.  A. H. STEBBINS  1,497,603
CONVEYER
Filed June 28, 1922
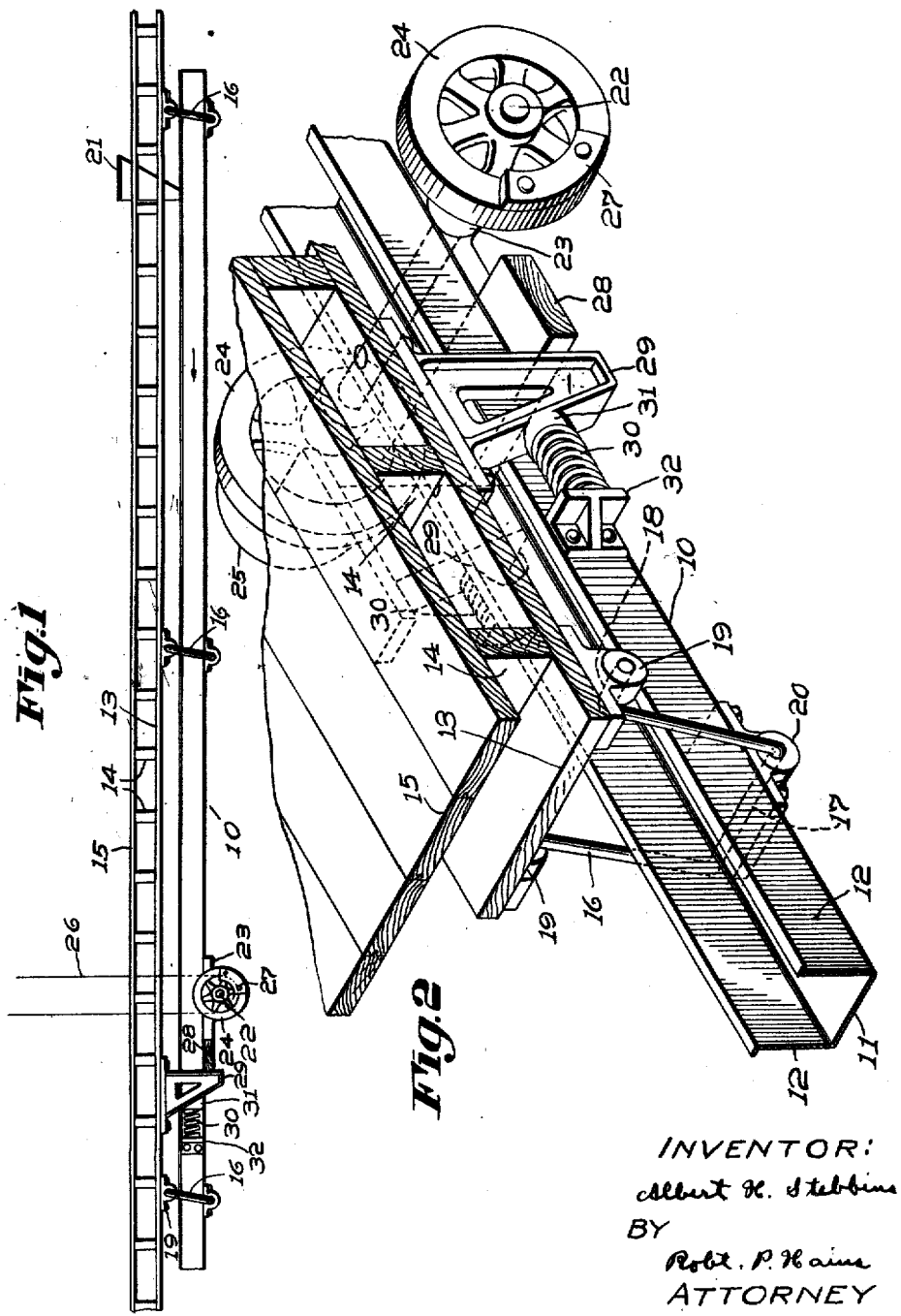
INVENTOR:
Albert H. Stebbins
BY
Robt. P. Haines
ATTORNEY Patented June 10, 1924.

1,497,603

UNITED STATES PATENT OFFICE.

ALBERT H. STEBBINS, OF LOS ANGELES, CALIFORNIA.

CONVEYER.

Application filed June 28, 1922. Serial No. 571,530.

*To all whom it may concern:*

Be it known that I, ALBERT H. STEBBINS, a citizen of the United States, residing at Los Angeles, in the county of Los Angeles and State of California, have invented an Improvement in Conveyers, of which the following description, in connection with the accompanying drawings, is a specification, like characters on the drawings representing like parts.

This invention relates to conveyers, and more particularly to a conveyer construction for conducting materials in a horizontal direction.

The primary object of the present invention is to provide a conveyer which is simple in construction and may be readily installed and operated to convey materials in a horizontal direction from one place to another.

One important feature of the present invention resides in means for supporting and operating a trough or other material supporting surface to promote travel of materials along the same.

A more specific feature of the invention resides in an unbalanced wheel which serves to impart a back and forth movement to the trough or other material supporting surface.

Other features of the invention and novel combination of parts in addition to the above will be hereafter described in connection with the accompanying drawings which illustrate one good practical form thereof.

In the drawings:

Fig. 1 is a side elevation of a conveyer constructed in accordance with the present invention: and Fig. 2 is an enlarged perspective view of parts shown in Fig. 1.

In the embodiment of the invention illustrated, a trough 10 is shown which is adapted to receive the materials to be conveyed and to direct the materials longitudinally thereof. The trough 10 may be variously constructed and in the construction shown is formed of metal having a bottom 11 and upstanding sides 12. The trough may be set up for operating in any available space, and in the present case is shown as suspended from the ceiling 13 of a building, and the ceiling is secured to floor beams 14 which support the floor 15.

The trough 10 may be variously supported to receive movement that will effect travel of materials longitudinally thereof, and in the present construction, the trough is suspended in a horizontal position from the ceiling 13 by arms 16. The arms may comprise rods having the U-shaped construction shown, and may have an intermediate portion 17 that extends under the trough 10, and laterally extending end portions 18 that enter bearing apertures in brackets 19 secured to the ceiling. The portion 17 of the trough supporting arms preferably is journaled in a bearing bracket 20 secured to the under face of the trough, and the upper ends 18 of the supporting arms are journaled in the brackets 19 for swinging movement.

A hopper 21 may serve to deliver the materials to be conveyed to the trough from the floor above, and the trough may be variously operated to cause the materials to travel along the same. In the present case it is assumed that the materials are to be conveyed along the trough in the direction indicated by the arrow, and this may be accomplished by imparting a back and forth movement to the trough which will cause the trough to be raised by the arms 16 as it moves in the direction in which the materials are to travel, and will be lowered by the arms as the trough moves in the opposite direction. In other words the trough should be operated so that an upthrow will be imparted thereto as it moves in the direction in which the materials travel. This upthrow movement will cause the materials to be tossed along the trough each time the movement of the trough is arrested in the upthrow direction. The movement of the trough 10 in the opposite direction preferably should be arrested before the arms 16 reach the vertical position, so that the materials will be forced toward the bottom of the trough by their momentum rather than lengthwise of the trough as the trough is brought to rest in this direction.

Various means may be provided for imparting back and forth movement to the trough 10 and simple means to this end consists in operating the trough from an unbalanced wheel so that the movement which results from rotating an unbalanced wheel will be imparted to the trough. In the present case a shaft 22 is journaled in bearings 23 secured to the trough 10, and an unbalanced wheel 24 is mounted upon the shaft 22 upon each side of the trough. The shaft and unbalanced wheels may be rotated from a pulley 25 driven by a belt 26. A weight 27 secured to one side of the wheels 24 serves to throw them out of balance and as the wheels 24 are rotated they will impart a back and forth movement to the trough which supports them.

Travel of materials along the trough may be further promoted by providing bump means to arrest the trough suddenly while moving in the direction indicated by the arrow, and to this end, a beam 28 is secured to the lower face of the trough transversely thereof in position to strike against fixed brackets 29 secured to the ceiling 13 and extending downwardly into the path of the beam 28. If desired, springs 30 may be provided upon each side of the trough 10 to urge the same in the direction indicated by the arrow, and one end of these springs may be seated in a socket 31 upon the brackets and the other end of these springs may react against angle plates 32 secured to the side plates 12 of the trough.

From the foregoing description and drawings it will be seen that the present conveyer is extremely simple in construction and operation, and since the unbalanced wheels which operate the trough are supported thereby, the trough operating means does not need to be supported independently of the trough, and as a result the conveyer may be readily installed for operation.

What is claimed is:

1. A conveyer comprising in combination, a trough supported in a horizontal position for movement back and forth in the direction of its length, and an unbalanced wheel operable to impart the movement resulting from its unbalanced rotation to the trough for movement of the trough back and forth to promote travel of the material upon the trough lengthwise thereof.

2. A conveyer comprising in combination, a trough supported in a horizontal position for movement back and forth in the direction of its length, and an unbalanced wheel operable upon rotation to move the trough back and forth to bump the same and thereby promote travel of materials upon the trough longitudinally thereof.

3. A conveyer comprising in combination, a trough supported by swinging arms for movement back and forth in the direction of its length and having the arms arranged to impart an upthrow movement to the trough as the latter moves in one direction to facilitate travel of materials along the trough, and an unbalanced wheel operable to impart the movement resulting from its unbalanced rotation to the trough to move the latter back and forth.

4. A conveyer comprising in combination, a trough supported by swinging arms for movement back and forth in the direction of its length and having the arms arranged to impart an upthrow movement to the trough as the latter moves in one direction to facilitate travel of materials along the trough, and an unbalanced wheel rotatably supported by the trough to impart the movement resulting from its unbalanced rotation to the trough to move the latter back and forth.

5. A conveyer comprising in combination, a conveying surface supported in a horizontal position by swinging arms for movement back and forth in the direction of its length, and an unbalanced wheel connected to the conveying surface and operable upon rotation to move the surface back and forth with bumping effect thereby to promote travel of materials along said surface.

6. A conveyer comprising in combination, a trough for conducting materials lengthwise thereof, and an unbalanced wheel mounted upon the trough to vibrate the latter upon rotation of the wheel and thereby promote travel of materials along the trough.

7. A conveyer comprising in combination, a trough for conducting materials lengthwise thereof, means for supporting the trough for movement back and forth in the direction of its length, and trough operating means supported entirely by the trough and operable to move the trough back and forth to promote travel of materials along the trough.

8. A conveyer comprising in combination, a trough supported by swinging arms for movement back and forth in the direction of its length and having the arms arranged to impart an upthrow movement to the trough as the latter moves in one direction, means for moving the trough back and forth, and spring means for urging the trough in the direction of its upthrow movement.

9. A conveyer comprising in combination, a trough supported in a horizontal position for movement back and forth in the direction of its length, and unbalanced rotatable means carried by the trough and adapted upon rotation to shake the trough and impart a back and forth movement thereto.

10. A conveyer comprising in combination, a conveying surface supported in substantially a horizontal position for back and forth movement in the direction of its length, unbalanced rotatable means adapted to vibrate upon rotation, and means for imparting the vibratory movement of the unbalanced means to the conveying surface to move the latter back and forth.

In testimony whereof, I have signed my name to this specification.

ALBERT H. STEBBINS.